July 18, 1933. R. R. FLEISCHER 1,918,802
MIRROR ATTACHMENT FOR MOTOR VEHICLES
Filed Aug. 27, 1932
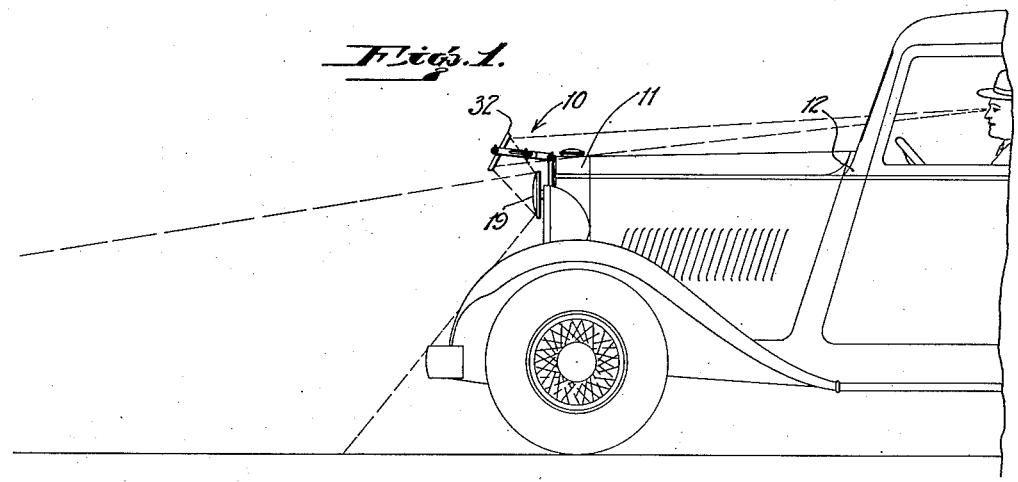
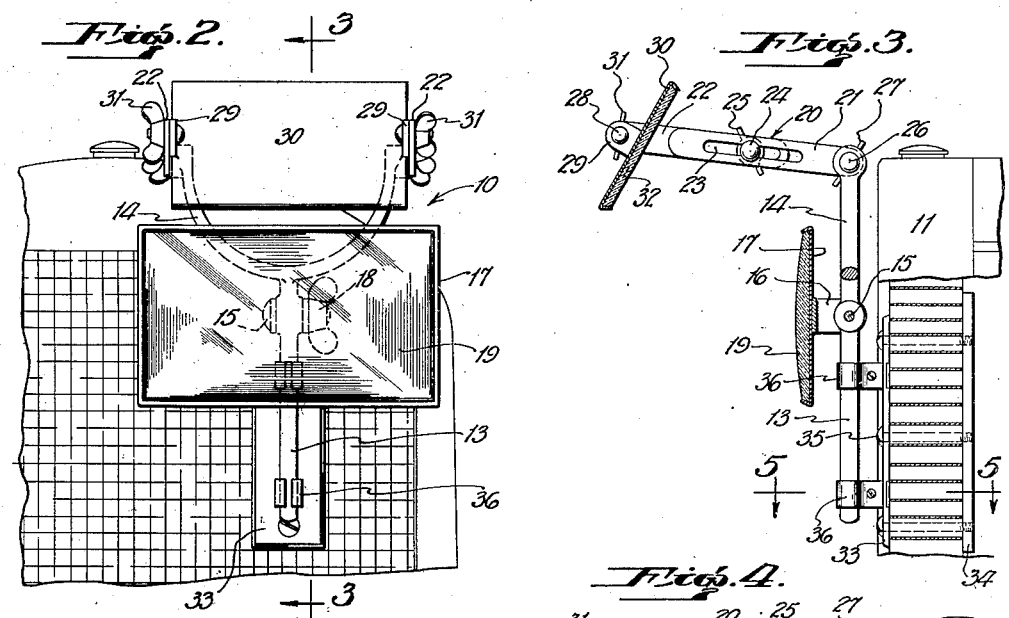
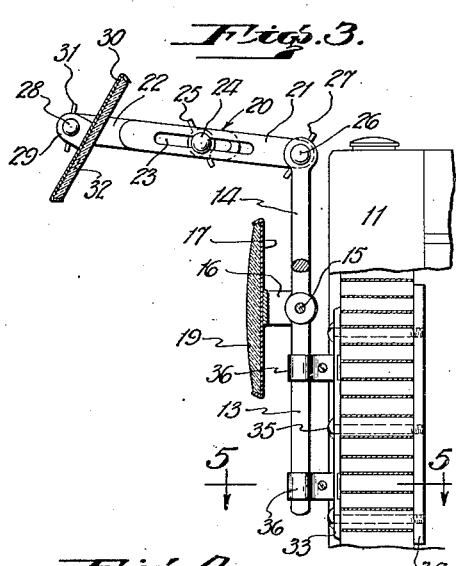
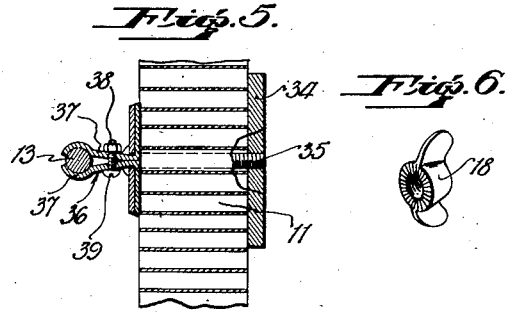
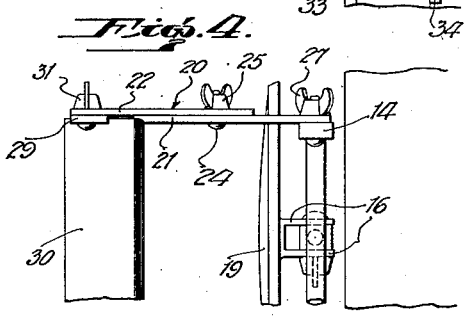
INVENTOR
RUDOLF R. FLEISCHER.
BY
Ely & Pattison
ATTORNEYS Patented July 18, 1933

1,918,802

UNITED STATES PATENT OFFICE

RUDOLF R. FLEISCHER, OF FREEPORT, NEW YORK

MIRROR ATTACHMENT FOR MOTOR VEHICLES

Application filed August 27, 1932. Serial No. 630,669.

This invention relates to improvements in mirror attachments for motor vehicles.

The primary object of the invention resides in a mirror attachment which may be mounted upon the radiator of a motor vehicle to enable the driver thereof to view that portion of the road directly in front of the vehicle which is normally not within the range of vision of the driver when seated in the operator's seat. Such a device will enable the driver to detect and avoid articles in the roadway which cannot ordinarily be discerned at a distance, and which might cause puncturing of a tire or undue shock or bumping of the vehicle when traveling over uneven roadways. The device will also prevent accidents to pedestrian children when a motor vehicle is stopped at a crossing to enable traffic on the cross street to proceed, as small children are likely to be injured by the fact that the driver is unable to see directly in front of the vehicle, and when starting the vehicle upon the proper signal to proceed, a child in the act of crossing may be in the path of the vehicle unbeknown to the driver and struck down.

Another object of the invention is to provide an attachment mounted forward of the radiator of a motor vehicle embodying a system of mirrors by which the operator of the motor vehicle when looking forward and without detracting his attention from the road ahead may also view that portion of the road directly in front of the vehicle.

Another object of the invention is to provide a mirror attachment which is adjustable for use upon various types of automobiles, and which may be applied to such vehicles without marring or detracting from the appearance thereof.

With these and other objects in view, the invention resides in certain novel construction, combination and arrangement of parts, the essential features of which are hereinafter fully described, are particularly pointed out in the appended claims, and are illustrated in the accompanying drawing, in which:—

Figure 1 is a fragmentary side elevational view of an automobile showing the invention in use thereon.

Figure 2 is an enlarged front elevational view.

Figure 3 is a vertical sectional view on the line 3—3 of Figure 2.

Figure 4 is a fragmentary top plan view.

Figure 5 is a detail horizontal sectional view on the line 5—5 of Figure 3.

Figure 6 is a detail perspective view of one of the securing nuts.

Referring to the drawing by reference characters, the numeral 10 designates my improved mirror attachment in its entirety, and which is shown in the drawing as supported by the radiator 11 of an automobile or motor vehicle 12.

The mirror attachment 10 embodies a supporting structure including a vertical rod 13 which terminates at its upper end in a yoke 14. Passing transversely through the rod 13 adjacent the bight portion of the yoke 14 is a pivot bolt 15 on which the rearwardly extending ears 16 of a mirror frame 17 are pivotally mounted. The ears 16 straddle opposite sides of the rod 13 and a thumb nut 18 is threaded to the threaded shank of the bolt 15 and when screwed home serves to support the mirror frame 17 in an adjusted position. The mirror frame 17 supports a convex image pick up mirror 19, the convex surface of the mirror extending in all directions from the center thereof as best seen in Figure 2 of the drawing.

Pivoted to the free ends of the yoke 14 and extending forwardly and outwardly therefrom are extensible arms 20, each arm consisting of a pair of lapping links 21 and 22. Slots 23 are provided in the links and bolts 24 extend through the slots and have thumb nuts 25 threaded to the shanks thereof. After the links have been adjusted relative to each other, thumb nuts 25 may be screwed home to secure the links in adjusted position.

The outer end of the links 21 are pivoted to bolts 26 extending through the free ends of the yoke 14, whereas thumb nuts 27 are threaded to the shanks of the bolts 26 and serve to secure the arms 20 in a position of pivotal adjustment.

The outer ends of the links 22 are pivoted by bolts 28 to the ears 29 of a mirror frame 30. Thumb nuts 31 are threaded to the shanks of the bolts 28, and when the same are screwed home, serve to support the mirror frame 30 in any desired position of adjustment. The mirror frame 30 supports a flat image receiving mirror 32 which serves to receive the image picked up by the convex mirror 19 and which image is reflected by the pick up mirror onto the receiving mirror.

For the purpose of securing the device to the radiator of an automobile, I provide attaching means which embodies a pair of plates 33 and 34 which are respectively fitted against the outer and inner sides of the radiator 11. Securing bolts 35 pass through the plates 33 and through the openings in the radiator and thread into the rear plates 34, thus the two plates serve as jaws drawn together by the screws 35.

Secured to and extending forwardly of the front plates 33 are vertically alined clamps 36, each of which includes a pair of coacting clamping jaws 37 which may be brought into clamping engagement or released by the turning of a nut 38 threaded to the shank of a screw or bolt 39 passing through the jaws 37. The jaws 37 of the clamp 36 receive the rod 13 and support the same in a fixed vertical position.

By reference to Figure 2 of the drawing, it will be seen that the device is mounted to one side of the radiator so that the receiving mirror 32 will be disposed substantially in the path of the vision of an operator seated at the wheel of the motor vehicle 12. When applying the device to the motor vehicle, the mirrors 19 and 32 are so adjusted that the pick up mirror 19 is capable of picking up and reflecting that portion of the roadway directly in front of the radiator, whereas the receiving mirror 32 is arranged at an angle with respect to the mirror 19 and is in the path of vision of the operator of the vehicle. Thus it will be seen that the roadway directly in front of the radiator may be viewed by the operator while looking forward at the road ahead and it is unnecessary for him to change his line of vision in order to observe that portion of the road which is ordinarily out of line of vision.

The purposes and advantages of the invention have been clearly stated hereinbefore and from the foregoing description, it is believed that the same are more clearly appreciated.

The device will work at night as well as in the daylight, as the pick-up mirror may be adjusted to pick up the image of the road ahead without reflecting the light beams of the headlights of approaching vehicles into the eyes of the driver of the car equipped with the invention.

While I have shown and described what I deem to be the most desirable embodiment of my invention, I wish it to be understood that various changes as come within the scope of the appended claims may be resorted to if desired.

Having thus described the invention, what I claim as new and desire to secure by Letters Patent of the United States, is:—

1. In combination with a motor vehicle having a radiator, a pair of mirrors arranged at a fixed angle with respect to each other, one of said mirrors facing forward of and disposed below the top of said radiator while the other of said mirrors is disposed above said radiator and faces rearwardly thereof, and attaching means for securing said mirrors in supported position upon said radiator.

2. A mirror attachment for motor vehicles comprising a rod, a yoke at one end of said rod, an adjustable image pick up mirror mounted on said rod, adjustable arms connected to and extending from the free ends of said yoke, an adjustable image receiving mirror supported by said arms, and means for detachably securing said rod to a support.

3. A mirror attachment for motor vehicles comprising a rod, a yoke at one end of said rod, an image pick up mirror pivoted on said rod, means for securing said image pick up mirror in adjusted position, extensible adjustable arms pivoted to the free ends of said yoke, means for securing said arms in a position of pivotal adjustment, an image receiving mirror pivotally supported by said arms, means for securing said image receiving mirror in an adjusted position, and attaching means for removably securing said rod to a supporting structure.

RUDOLF R. FLEISCHER.